April 25, 1933.  K. PFEIFFER  1,905,498
VALVE SPRING
Filed March 19, 1928
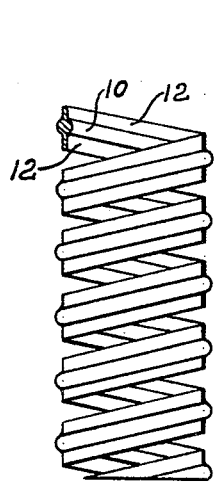
Fig. 1.
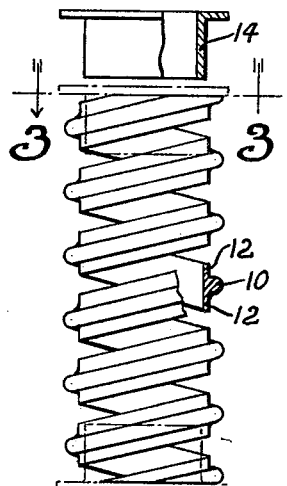
Fig. 2.
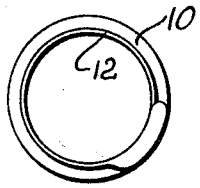
Fig. 3.
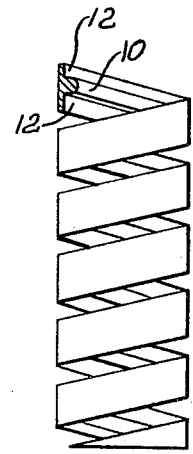
Fig. 6.
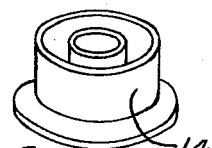
Fig. 5.
Fig. 4.
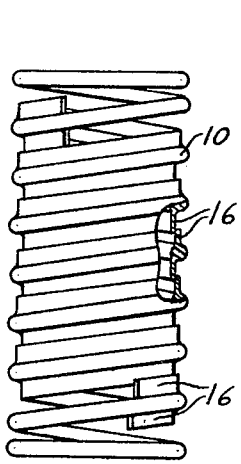
Fig. 7.
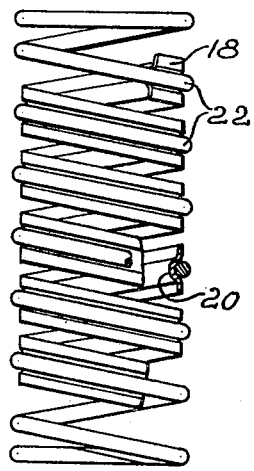
Fig. 8.
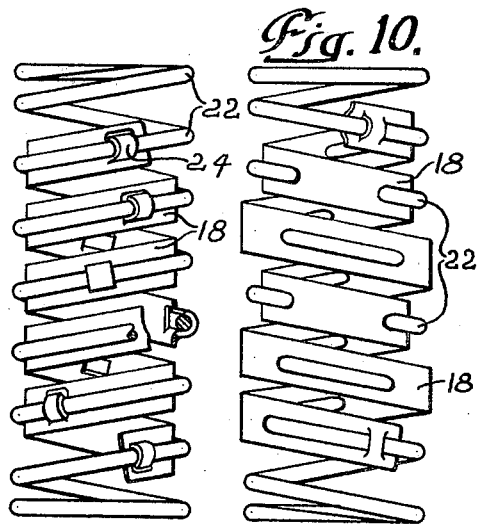
Fig. 9.  Fig. 10.
INVENTOR
KARL PFEIFFER.
BY
ATTORNEY Patented Apr. 25, 1933

1,905,498

UNITED STATES PATENT OFFICE

KARL PFEIFFER, OF DETROIT, MICHIGAN, ASSIGNOR TO CHRYSLER CORPORATION, OF DETROIT, MICHIGAN, A CORPORATION OF DELAWARE

VALVE SPRING

Application filed March 19, 1928. Serial No. 262,730.

This invention relates to springs and more particularly to coil springs such as are used for valve springs of an internal combustion engine.

A round section coiled spring is ideal for forming a helical spring and is practical for carrying the torsional load but has been found to be an impractical section to carry vibration loads due to its own weight which causes the wire to deflect between its end coils in the direction of the compression similar to a static load bending a beam. If this section is increased to take care of the vibration load then the spring is too stiff for use as a valve spring.

It is an important object of this invention to provide a spring having stiffening means extending in a direction parallel to the compression strain of the spring. Such a construction increases the strength of the spring for a vibration load and permits free torsional movement without increasing the actual mass of the spring.

If the mass is increased such as providing a larger cross sectional area the spring is too heavy and the extra mass not used in the functioning of the spring adds static load to cause the spring to vibrate more.

It is another object of this invention to provide a spring having a cross sectional area smaller in one direction than the direction in which the load is applied to the spring.

Other objects of the invention will more fully appear from the following description taken in connection with the accompanying drawing, in which:

Fig. 1 is a side elevation of a helical spring showing an embodiment of my invention, one end being shown in section.

Fig. 2 is a side elevation of a modified form of a valve spring, parts being broken away.

Fig. 3 is a sectional view taken on line 3—3 of Fig. 2.

Fig. 4 is a perspective view of the spring seat.

Fig. 5 is a sectional view of the lower end of the valve spring showing a modified form in which the spring is made integral with the seat.

Fig. 6 is a side elevation showing a further modification of my invention.

Fig. 7 is a side elevation of a valve spring, parts being broken away, showing a form of my invention in which the coils of the spring are frictionally engaged one with the other.

Figs. 8, 9 and 10 are each modified forms of my invention in which an additional helical member is carried by the spring to increase its rigidity in the direction of the load.

Referring to the drawing, particularly to Fig. 1, I have shown a spring having a coiled body portion 10 and oppositely extending flanges 12 formed integral with the body portion 10. In this form of the device the wire is pressed into shape and spirally coiled to the form shown.

Referring to Fig. 2 the flanges 12 are adjacent the inner side of the body portion 10. Such a spring may be formed by coiling the wire or may be machined from a piece of tubing. The dotted lines indicate the position of the valve spring seats 14 which are received in the opposite ends of the tubular member. It will be understood that if the body portion 10 is on the outer side of the spring, this form is best adapted for machining; the inner periphery retains the shape of the tubing and the machining is external of the tube. If desired the spring seat 14 may be machined integral with the coils as shown in Fig. 5. When it is desired to coil the material for the spring, a form shown in Fig. 6 is best adapted for this purpose as the outer periphery of the spring is smooth.

In order to dampen out the natural vibration of the spring I have shown in Fig. 7 overlapping flanges 16 adapted for frictional engagement. The flanges 16 are shown staggered or they may be arranged at an angle for frictional engagement with each other.

As a means for carrying out my invention on a spring having its coils made from a round cross section, I have shown as in Figs. 8, 9 and 10 a coiled member adapted to be received by the spring. The form shown in Fig. 8 consists of a flat coiled member 18 having a central inwardly pressed portion 20 which receives the spring coils 22. The member 18 may be coiled larger in diameter than the coils 22 so that when the member 18 is in position it is under tension tightly engaging the spring 22. If desired the member 18 may be secured to the coils 22 by clips 24 bent around the coils 22, as shown in Fig. 9, or the member 18 may be laced on the coils 22 by threading the latter through openings in the member 18.

It will be understood that while several embodiments of my invention have been illustrated the invention resides in providing static load stiffening means for the spring and yet retaining a spring which is free for torsional strains.

It will be obvious that various changes may be made in the arrangement, combination and construction of the various parts of my improved device without departing from the spirit of my invention and it is my intention to cover by my claims such changes as may reasonably be included within the scope thereof.

What I claim is:

1. A resilient member of the class described comprising, a coiled body portion, and oppositely extending relatively thin flanges on said body portion.

2. A resilient member of the class described comprising, a coiled body portion, and oppositely extending relatively thin flanges on said body portion, said flanges extending parallel to the axis of said coil and at one side of said body portion.

3. A resilient member of the class described comprising, a helically coiled body portion, and oppositely extending flanges on said body portion, the flanges on the one side of each coil being in axial alignment with the flanges on the other side of each coil.

4. A resilient member of the class described comprising, a helically coiled annular body portion, and a pair of oppositely extending flanges on said body portion, said flanges extending parallel to the axis of said coil.

5. A screw machine product of helical formation having a helical body portion and oppositely extending thin flanges on said body portion.

6. A screw machine product of helical formation having a helical body portion and oppositely extending relatively thin flanges on said body portion, the flanges of one coil being in axial alignment with the flanges of the other coils.

7. A screw machine product of helical formation having a helical body portion, oppositely extending relatively thin flanges on said body portion, and apertured members at the end of said helical body portion and integral therewith, the flanges of one coil being in axial alignment with the flanges of the other coil.

8. A resilient member of the class described comprising a helically coiled member, and a helically coiled member carried by said first named member and projecting axially of said coil beyond the edge of said first named member, the coils of one coiled member secured to the coils of the other coiled member to move therewith as a single unit.

9. A resilient member of the class described comprising a helically coiled member, another helically coiled member carried by said first named member and projecting axially of said coil beyond the edge of said first named member, and means carried by said last named member for securing the coils of one coiled member to the coils of the other coiled member.

KARL PFEIFFER.